July 14, 1953  B. J. ALECK  2,645,119
TORQUEMETER BASED ON WARPING STRESS MEASUREMENT
Filed July 22, 1950
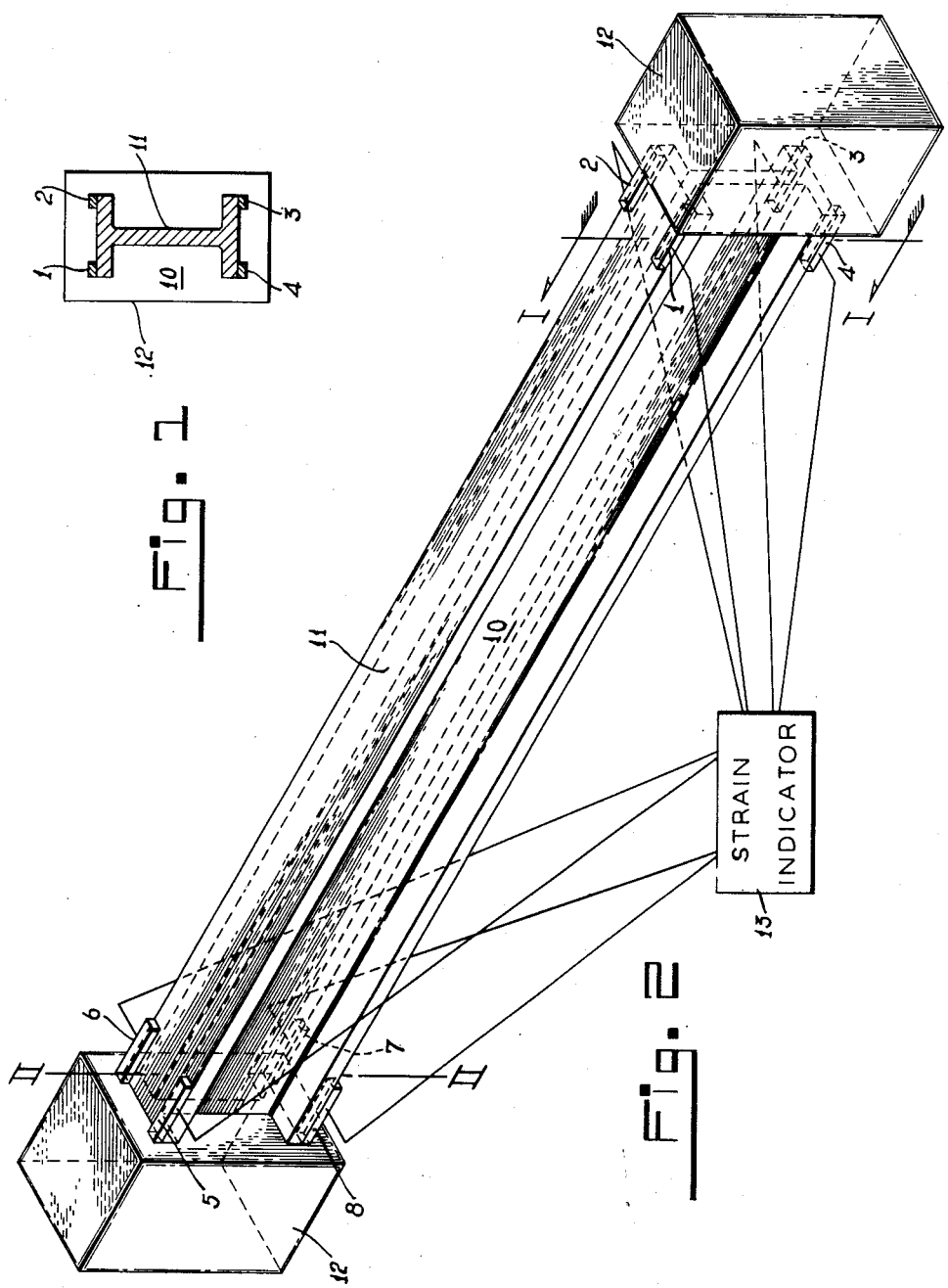
INVENTOR.
BENJAMIN J. ALECK
BY Virgil F Davies
Joseph Daleda
ATTORNEYS Patented July 14, 1953

2,645,119

UNITED STATES PATENT OFFICE 2,645,119

TORQUEMETER BASED ON WARPING STRESS MEASUREMENT

Benjamin J. Aleck, Brooklyn, N. Y., assignor to The M. W. Kellogg Company, Jersey City, N. J., a corporation of Delaware Application July 22, 1950, Serial No. 175,413

4 Claims. (Cl. 73—133)

This invention relates generally to apparatus for measuring torque and more particularly to an improved torquemeter for the sensitive measurement of low torque values using wire resistance strain gages as the measuring element.

A general type of strain gage torquemeter measures strains at 45° to the longitudinal axis of the torque bar, the dimensions of which cannot be reduced below a minimum determined by the size of the strain gages used, so that limited sensitivity is obtained for measuring small torque values.

Another type converts the torque into a bending moment in a bar (or bars) at right angles to its longitudinal axis and then measures the bending strain, but when several loads are to be measured, the end attachments become extremely complex.

It is an object of the present invention to provide a strain gage type torquemeter having improved sensitivity for measuring torque and force of small magnitudes.

It is another object of the present invention to provide an improved torque bar for strain gage type torquemeters which is adaptable for the measurement of low torque and small force values.

It is a further object of invention to provide a torque bar in a strain gage torquemeter wherein maximum strains are developed parallel to the longitudinal axis thereof and space and convenience for installation of gages are afforded.

Other objects and advantages will be apparent to those skilled in the art from the following description of the accompanying drawings in which:

Fig. 1 shows a cross section of the torque bar of a strain gage type torquemeter taken on line I—I of Fig. 2.

Fig. 2 shows an isometric view of the torque bar of the present invention.

It is found from the theory of elasticity that plane sections perpendicular to the longitudinal axis of a prismatic, non-circular member warp when a torque is applied about the longitudinal axis. If the prismatic member is made integral with or attached to a stiffer end member which resists the warping at the junction, then strains will develop adjacent the junction in a direction parallel to the longitudinal axis of the prismatic member.

Referring to the drawings, electrical strain gages are indicated at 1 to 8 inclusive and are mounted on torque bar 10 on the flanges of prismatic member or beam 11 adjacent the stiff end members 12.

These electrical strain gages of the bonded type are cemented to the surface of the material on the outside edges of the flanges of the beam and are parallel to the longitudinal axis of the torque bar, this axis passing through the end sections and being parallel to the flanges and midway the outside dimensions of a cross section of the beam. Such an orientation is not only in the direction of maximum strain induced by warping but is most convenient for installation of gages and permits stress measurement independent of the web depth. The exact locations of the gages are not critical provided symmetry is maintained.

The torque bar 10 can be either machined from a single piece of material or made into an integral unit by some method such as welding, brazing or cementing. The material used must maintain a linear stress-strain relationship over the range of loads to be measured while the dimensions are determined by the loads which are to be applied to one of the stiff end members 12, while the other stiff end member is supported.

The cross section of torque bar 10 as indicated in Fig. 1 is substantially that of an I-shaped beam but other configurations of open cross section might be used, so long as they possess double symmetry and flanges off the centroidal axis.

It is readily apparent that if a load or torque is applied to the free end of the torque bar 10 while the other end is supported, there is a displacement of the center lines of the top and bottom flanges of the beam section of the bar and that the flexural stresses thus produced in the flanges are warping stresses due to the torsion. Since open sections, such as a flat web, channel or I-beam have weak torsional properties, these warping stresses are higher than the corresponding shear stresses for a closed section of the same cross sectional area, so that higher sensitivity of measurement is possible.

If we designate the unit strain measured at gage 1 as $e_1$, at gage 2 as $e_2$, etc., and extensions as positive, contractions as negative, then the strains acting on the strain gages 1 to 4 inclusive of Fig. 1 due to torque about the longitudinal axis can be summed up as $e_1-e_2+e_3-e_4$. This strain can then be calibrated against the applied torque so that torque$=K_1(e_1-e_2+e_3-e_4)$, where $K_1$ is found experimentally.

The unit strains can be determined by any of the methods employed with electrical gages and substituted into the above expressions for finding torque or force, e. g. values proportional to the expression enclosed in parentheses can be obtained directly by connecting the gages to form the arms of a Wheatstone bridge in the right combination and measuring the unbalance voltage produced by the change in resistance due to the load applied, e. g. a signal proportional to a torque will be produced when the gages are connected to form Wheatstone bridge arms as follows: series circuits composed of gages 1 and 2 and gages 4 and 3 connected in parallel and with a galvanometer across the parallel legs between gages 1 and 2 and gages 4 and 3. A strain indicator, in block form, is shown at 13.

If all 8 gages are used, and are located to permit a change in position in the bridge and to indicate bending parallel or perpendicular to the web, then it is possible to use this type of torquemeter to measure.

1. Torque about a horizontal axis perpendicular to the longitudinal axis of the torque bar.
2. Torque about a vertical axis.
3. Shearing force in a horizontal direction perpendicular to the longitudinal axis of the torque bar.
4. Shearing force in a vertical direction.
5. Force in an axial direction (relatively insensitively).

Since this type of torquemeter is desirable for use as a "sting" for supporting wind tunnel models, then the measurements of roll torque, pitching moment, yawing moment, lift and side force are readily available. Drag could be measured but the sensitivity would be low.

Using the conventional indications as indicated above, then the various torque and force values can be found from the following algebraic expressions where the subscripted K is the proportionality constant, determined by experiment:

Torque about the horizontal axis, perpendicular to the longitudinal axis, at section I—I is $$T_2 = K_2 (e1 + e2 - e3 - e4)$$

Torque about the vertical axis, at section I—I is $$T_3 = K_3 (e1 - e2 - e3 + e4)$$

Shearing force in a horizontal direction, perpendicular to the longitudinal axis between sections I—I and II—II is $$F_1 = K_4 (e1 - e2 - e3 + e4 - e5 + e6 + e7 - e8)$$

Shearing force in a vertical direction, between sections I—I and II—II is $$F_2 = K_5 (e1 + e2 - e3 - e4 - e5 - e6 + e7 + e8)$$

Force in an axial direction, normal to sections I—I and II—II is $$F_3 = K_6 (e1 + e2 + e3 + e4) -$$
temperature compensation No attempt will be made to show how the various gages are connected in the Wheatstone bridges, as it is considered that the expert mechanic is capable of combining the same to obtain the desired proportional values.

Although many changes can be made by those skilled in the art of the disclosed apparatus without departing from the scope of the invention, it is intended that all matter contained in the above description and shown in the accompanying drawings shall be interpreted as illustrative and not limitative.

What is claimed is:

1. A torque or force meter comprising a torque bar having a central open I-shaped cross section between more substantial end sections and with flanges extending symmetrically about the centroidal axis, pairs of electrical strain gages installed symmetrically at the outer dimensions of said flanges adjacent said sections, and means for combining the readings of said gages to obtain indications proportional to the torque and forces applied to said bar, comprising a Wheatstone bridge.

2. A strain gage type torquemeter comprising a torque bar of substantially I-shaped cross section between more substantial end portions, pairs of wire resistance strain gages symmetrically installed on the outer portions of the flanges of said bar adjacent said end portions, and means for measuring the strains indicated by said gages and for combining the measurements obtained to indicate the torque or forces in one of several different directions, comprising a Wheatstone bridge.

3. A torquemeter comprising a torque bar of substantially I-shaped cross section between more substantial end sections, strain gages installed on the outside edges of the flanges of said I-shaped cross section parallel to the longitudinal axis of said bar adjacent said end sections, said axis being taken perpendicular to the plane containing all the dimensions of said cross section and midway the outer dimensions of said cross section and passing through said end sections, and means comprising a Wheatstone bridge for combining the strains indicated by said gages to obtain readings proportional to the torque about the longitudinal, vertical and horizontal axes of said bar and to the forces in the axial, vertical, and horizontal directions, said vertical and horizontal axes and directions being taken normal to said longitudinal axis and axial direction as in the conventional x—y—z system of coordinates, said axial direction being parallel to said longitudinal axis.

4. A strain gage type torquemeter comprising a torque bar having substantially solid ends and a central section of an I-shaped cross section, electrical strain gages of the bonded type installed on the edges of the flanges adjacent the ends of said central section and parallel to the longitudinal axis of said bar, means for measuring the algebraic sum of the strains indicated by different combinations of said gages to obtain readings proportional to the individual torques about the longitudinal, vertical and horizontal axis of said bar and the forces in the axial, vertical, and horizontal directions, and comprising a Wheatstone bridge, said vertical and horizontal axes and directions being taken at right angles to said longitudinal axis and axial direction, analogous to conventional y and z coordinates, said longitudinal axis and said axial direction being parallel.

BENJAMIN J. ALECK.

References Cited in the file of this patent

UNITED STATES PATENTS

| Number | Name | Date |
|---|---|---|
| 1,986,406 | Norton | Jan. 1, 1935 |
| 2,392,293 | Ruge | Jan. 1, 1946 |
| 2,415,513 | Martin et al. | Feb. 11, 1947 |